United States Patent

Nakahara et al.

[11] Patent Number: 5,905,130
[45] Date of Patent: May 18, 1999

[54] PROCESS FOR THE PRODUCTION OF POLYSILAZANE

[75] Inventors: Hirohiko Nakahara; Osamu Funayama, both of Iruma-gun; Takeshi Isoda, Niiza, all of Japan

[73] Assignee: Tonen Corporation, Japan

[21] Appl. No.: 08/894,663

[22] PCT Filed: Jan. 6, 1997

[86] PCT No.: PCT/JP97/00005

§ 371 Date: Aug. 25, 1997

§ 102(e) Date: Aug. 25, 1997

[87] PCT Pub. No.: WO97/24391

PCT Pub. Date: Jul. 10, 1997

[30] Foreign Application Priority Data

Dec. 28, 1995 [JP] Japan .................................. 7-343908
Dec. 29, 1995 [JP] Japan .................................. 7-354067

[51] Int. Cl.$^6$ ................................................ C08G 77/08
[52] U.S. Cl. ................... 528/14; 528/15; 528/17; 528/18; 528/19; 528/21; 528/28; 528/38
[58] Field of Search .................. 528/28, 38, 14, 528/15, 19, 21, 17, 18

[56] References Cited

U.S. PATENT DOCUMENTS 4,725,660  2/1988  Serita et al. .............................. 528/38
5,612,410  3/1997  Kondo et al. ............................. 528/38

Primary Examiner—Melvyn I. Marquis
Attorney, Agent, or Firm—Lorusso & Loud

[57] ABSTRACT

Disclosed is a process for the production of a polysilazane containing Si—N linkages in the main chain thereof. According to the present invention, the polysilazane is produced by reacting a polyaminosilane compound with a polyhydrogenated nitrogen-containing compound in the presence of a basic catalyst or by reacting a polyhydrogenated silicon compound with a polyhydrogenated nitrogen-containing compound in the presence of a basic solid oxide catalyst.

18 Claims, No Drawings

PROCESS FOR THE PRODUCTION OF POLYSILAZANE

TECHNICAL FIELD

The present invention relates to a process for the production of a polysilazane which is a high molecular weight polymer serving as a precursor for a heat-resistant ceramic and which has Si—N linkages in the main chain thereof.

BACKGROUND ART

Polysilazanes which provide easiness in molding works can easily give ceramic molded articles having various shapes when used as a raw material for molding.

Since a dense, high purity silicon oxide film (amorphous $SiO_2$) is obtainable when an organic solvent solution of a polysilazane is used as a coating liquid and is calcined in air for reaction with water and oxygen, the polysilazane with such characteristics is practically used as a high purity silica coating material Various methods are conventionally known for the synthesis of polysilazanes. For example, the following methods are known:

(1) A method for the synthesis of a polysilazane in which a silicon halide such as $SiCl_4$ or $SiH_2Cl_2$ is reacted with an amine (Japanese Published Unexamined Patent Applications No. Sho-60-226890, No. Sho-62-290730 and No. Sho-63-309526 and Japanese Examined Patent Publications No. Hei-2-15577 and No. Hei-6-62775, etc.);

(2) A method in which a silazane is converted into a polysilazane using an alkali metal hydride catalyst such as KH having dehydrogenation activity (J. of Faint Technology Vol. 42, No. 543, April 1970, Japanese Published Unexamined Patent Applications No. Sho-60-226890, No. Sho-62-290730 and Sho-63-309526 and Japanese Examined Patent Publications No. Hei-2-15577 and No. Hei-6-62775, etc.); and (3) A method for the synthesis of a silazane by dehydrogenation of a silane compound with an amine compound using a transition metal complex catalyst such as $Ru_3(CO)_{12}$ (organometallics 1986, 5, 2081–2086, etc.).

With method (1) above, however, an ammonium salt of hydrogen halide acid is produced as a by-product in a larger amount than the polysilazane, so that a large amount of the polymer is lost during the removal of the by-product. With method (2) above, it is necessary to take great care of the handling of the metal hydride catalyst which is dangerous, so that the method is ill-suited for a large scale synthesis. With method (3) above, it is very difficult to separate, after the reaction, the synthesized polymer from the transition metal complex catalyst such as $Ru_3(CO)_{12}$ which is very expensive and which is a homogeneous catalyst.

To avoid the use of a catalyst which generates a large amount of a by-product, which is dangerous or which is expensive, the following methods have been proposed in which an aminosilane is reacted with ammonia:

(4) A method in which an aminosilane is subjected to amine inter-exchange with ammonia using an acid catalyst such as $CF_3SO_3H$ (Japanese Published Unexamined Patent Application No. Sho-62-225534 and Japanese Examined Patent Publication No. Hei-4-60492); and (5) A method in which an aminosilane is subjected to amine inter-exchange with a large amount of ammonia or an amine (Japanese Examined Patent Publication No. Hei-5-60488).

In the above method (4), however, since the ammonia as well as the amine liberated as a result of the amine interexchange are basic, the acid catalyst used reacts with the basic substances, so that the effect of the acid is diminished, resulting in a considerable reduction of the yield of the polymer. With the above method (5) using a large, excess amount of ammonia or an amine, a greater part of the ammonia and amine is discharged from the reaction system without being utilized for the synthesis, so that the method is disadvantageous from the standpoint of costs.

DISCLOSURE OF THE INVENTION

It is an object of the present invention to provide a process for the production of a polysilazane with reduced costs and a high yield in a stable manner.

The present inventors have made an intensive study with a view toward solving the above problem and, as a result, have completed the present invention.

Namely, in accordance with the present invention there is provided a process for the production of a polysilazane having Si—N linkages in the main chain thereof, characterized in that a polyaminosilane compound having at least two amino groups bonded to a silicon atom thereof is subjected to an amine inter-exchange reaction with a polyhydrogenated nitrogen-containing compound having at least two hydrogen atoms bonded to the nitrogen atom in the presence of a basic catalyst.

The present invention also provides a process for the production of a polysilazane having Si—N linkages in the main chain thereof, characterized in that a polyhydrogenated silicon compound having at least two hydrogen atoms bonded to the silicon atom is reacted with a polyhydrogenated nitrogen-containing compound having at least two hydrogen atoms bonded to the nitrogen atom in the presence of a basic solid oxide catalyst.

The polyaminosilane compound used for the purpose of the present invention is a silane compound having at least one silicon atom (Si) in the molecule thereof and at least two amino groups bonded to the silicon atom. The preferable polyaminosilane compound is represented by the following general formula:

$$Si(R_1)(R^2)(R^3)(R^4) \qquad (I)$$

wherein $R^1$, $R^2$, $R^3$ and $R^4$ each stand for an amino group, a hydrogen atom, a hydrocarbon group, a hydrocarbyloxy group, an acyl group, an acyloxy group or a hydrocarbyloxycarbonyl group with the proviso that at least two of $R^1$–$R^4$ are amino groups.

The amino group includes a substituted or non-substituted amino group and may be represented by the following general formula (II):

$$—N(R^5)(R^6) \qquad (II)$$

wherein $R^5$ and $R^6$ each stand for a hydrogen atom, a hydrocarbon group, a hydrocarbyloxy group, an acyl group, an acyloxy group or an alkoxycarbonyl group.

The above-mentioned hydrocarbon group includes an aliphatic hydrocarbon group and an aromatic hydrocarbon group. The aliphatic hydrocarbon group includes an alkyl group, an alkenyl group, a cycloalkyl group and a cycloalkenyl group. The aromatic hydrocarbon group includes an aryl group and an arylalkyl group. These aliphatic and aromatic hydrocarbon groups may contain a substituent such as a halogen atom, e.g. a chlorine or bromine, a hydroxyl group, a carboxyl group, a hydrocarbyloxy group, an acyl group, an acyloxy group, a hydrocarbyloxycarbonyl group or an amino group.

The above-mentioned alkyl group may be an alkyl group having 1–50, preferably 1–10, more preferably 1–4 carbon atoms. Illustrative of the alkyl groups are methyl, ethyl, propyl, butyl, heptyl, hexyl, pentyl, octyl, decyl, dodecyl, stearyl, eicosyl and behenyl.

The above-mentioned alkenyl group may be an alkenyl group having 2–50, preferably 2–10, more preferably 2–4 carbon atoms. Illustrative of the alkenyl groups are vinyl, propenyl, butenyl, hexenyl, octenyl and dodecenyl.

The above-mentioned cycloalkyl group may be a cycloalkyl group having 3–50, preferably 3–10 carbon atoms. Illustrative of the cycloalkyl groups are cyclohexyl and cyclooctyl.

The above-mentioned cycloalkenyl group may be a cycloalkenyl group having 3–50, preferably 3–10 carbon atoms. Illustrative of the cycloalkenyl groups are cyclohexenyl and cyclooctenyl.

The above-mentioned aryl group may be, for example, phenyl, tolyl or naphthyl.

The above-mentioned arylalkyl group may be, for example, benzyl, phenethyl or naphthylmethyl.

The above-mentioned hydrocarbyloxy group includes an aliphatic hydrocarbyloxy group and an aromatic hydrocarbyloxy group. The aliphatic hydrocarbyloxy groups include linear and cyclic alkyloxy groups having 1–50, preferably 1–10, more preferably 1–4 carbon atoms. Illustrative of aliphatic hydrocarbyloxy groups are methoxy, is ethoxy, propoxy, butoxy, hexyloxy, octyloxy and cyclohexyloxy. The aromatie hydrocarbyloxy groups include aryloxy and arylalkyloxy groups. Illustrative of the aryloxy groups are phenyloxy, tolyloxy and naphthyloxy. Illustrative of arylalkyloxy groups are benzyloxy, phenethyloxy and naphthylmethyloxy.

The acyl group includes an acyl group having an aliphatic hydrocarbon group and an acyl group having an aromatic hydrocarbon group. The aliphatic hydrocarbon group and aromatic hydrocarbon group may be as described above. Illustrative of the acyloxy groups are acetyloxy, propyonyloxy, benzoyloxy, toluoyloxy and naphthoyloxy.

The above-mentioned hydrocarbyloxycarbonyl group includes a hydrocarbyloxycarbonyl group having an aliphatic hydrocarbon group and a hydrocarbyloxycarbonyl group having an aromatic hydrocarbon group. The aliphatic hydrocarbon group and aromatic hydrocarbon group may be as described above. Illustrative of the hydrocarbyloxycarbonyl groups are methoxycarbonyl, ethoxycarbonyl, propoxycarbonyl, cyclohexyloxycarbonyl, phenyloxycarbonyl, naphthyloxycarbonyl and benzyloxycarbonyl.

The polyaminosilane compound preferably used in the present invention is a silane having 2–4 dialkylamino groups represented by the following general formula (III):

$$Si(NR^7R^8)_n H_{4-n} \qquad (III)$$

wherein $R^7$ and $R^8$ each stand for an alkyl group and n is an integer of 2–4. The alkyl group may be a lower alkyl group having 1–4 carbon atoms such as methyl, ethyl, propyl and butyl.

The polyaminosilane compound especially preferably used in the present invention is $SiH_2(NMe_2)_2$, $SiH(NMe_2)_3$ and $Si(NMe_2)_4$. Above all $SiH_2(NMe_2)_2$ is most preferably used.

The above-mentioned polyaminosilane compound having at least two amino groups bonded to a silicon atom thereof may be used in conjunction with a monoaminosilane compound having one amino group such as $SiH_3NMe_2$. The amount of the monoaminosilane compound used is not more than 80 mole %, preferably not more than 50 mole %, based on a total amount of the monoaminosilane compound and the polyaminosilane compound. For reasons of producing a high molecular weight polysilazane, the amount is desirably not more than 20 mole %. The monoaminosilane compound serves as an agent for controlling the molecular weight of the polysilazane and is bonded to a terminus of the polysilazane polymer. The monoaminosilane compounds include compounds of the general formula (I) in which one of $R^1$–$R^4$ is an amino group.

Another silicon compound used in the present invention is a polyhydrogenated silicon compound having at least one silicon atom in the molecule thereof and at least two hydrogen atoms bonded to the silicon atom.

The preferable polyhydrogenated silicon compound is represented by the following general formula (IV) or (V):

$$Si(R^{11})(R^{12})(R^{13})(R^{14}) \qquad (IV)$$

$$(R^{17})(R^{16})(R^{15})Si—Si(R^{11})(R^{12})(R^{13}) \qquad (V)$$

wherein $R^{11}$–$R^{14}$ and $R^{15}$–$R^{17}$ each stand for a hydrogen atom, a hydrocarbon group, a hydrocarbyloxy group, an acyl group, an acyloxy group or a hydrocarbyloxycarbonyl group. In the general formula (IV), at least two of $R^{11}$–$R^{14}$ are hydrogen atoms. In the general formula (V), at least two of $R^{11}$–$R^{13}$ and $R^{15}$–$R^{17}$ are hydrogen atoms.

The above-mentioned hydrocarbon group includes an aliphatic hydrocarbon group and an aromatic hydrocarbon group. The aliphatic hydrocarbon group includes an alkyl group, an alkenyl group, a cycloalkyl group and a cycloalkenyl group. The aromatic hydrocarbon group includes an aryl group and an arylalkyl group. These aliphatic and aromatic hydrocarbon groups may contain a substituent such as a halogen atom, e.g. a chlorine or bromine, a hydroxyl group, a carboxyl group, a hydrocarbyloxy group, an acyl group, an acyloxy group, a hydrocarbyloxycarbonyl group or an amino group. Examples of the hydrocarbon group, hydrocarbyloxy group, acyl group, acyloxy group and hydrocarbyloxycarbonyl group include those described above in connection with the general formula (I).

Illustrative of suitable polyhydrogenated silicon compounds are $SiH_4$, $CH_3SiH_3$, $C_2H_5SiH_3$, n—$C_3H_5$ $SiH_3$, $C_6H_5SiH_3$ $ClC_6H_4SiH_3$, HOOC—$C_6H_4SiH_3$, $CH_3$—$SiH_3$, $H_2NCH_2SiH_3$, $CH_2$=$CHSiH_3$, $(CH_3)_2SiH_2$, $(CH_3)$ $(C_2HS)$ $SiH_2$, $(CH_3)$ $(C_6H_5)SiH_2$, $H_3Si$–$SiH_3(CH_3)$ $H_2Si$—$SiH_3$, $(CH_3)H_2Si$—$SiH_2$–$(CH_3)$. In the present invention, $SiH_4$, $CH_3SiH_3$, n—$C_3H_7$ $SiH_3$ and $C_6H_5SiH_3$ are more preferably used.

The above-mentioned polyhydrogenated silicon compound may be used in conjunction with a monohydrogenated silicon compound having one hydrogen atom. The amount of the monohydrogenated silicon compound is not more than 90 mole %, preferably not more than 70 mole %, based on a total amount of the monohydrogenated silicon compound and the polyhdyrogenated silicon compound. For reasons of producing a high molecular weight polysilazane, the amount is desirably not more than 50 mole %, more desirably not more than 30 mole %. The monohydrogenated silicon compounds include compounds of the general formulae (IV) and (V) in which one of $R^{11}$–$R_{18}$ or one of $R^{11}$–$R^{18}$ is a hydrogen atom. The monohydrogenated silicon compound serves as an agent for controlling the molecular weight of the polysilazane polymer and is bonded to a terminus thereof.

The polyhydrogenated nitrogen-containing compound used in the present invention is a compound having at least one nitrogen atom and at least two hydrogen atoms bonded to the nitrogen atom and is preferably a compound represented by the following general formula (VI):

$$R^{21}NH_2 \quad (VI)$$

wherein $R^{21}$ stands for a hydrogen atom, a hydrocarbon group, a hydrocarbyloxy group, an acyl group, an acyloxy group or a hydrocarbyloxycarbonyl group.

The above-mentioned hydrocarbon group includes an aliphatic hydrocarbon group and an aromatic hydrocarbon group. The aliphatic hydrocarbon group includes an alkyl group, an alkenyl group, a cycloalkyl group and a cycloalkenyl group. The aromatic hydrocarbon groups include an aryl group and an arylalkyl group. These aliphatic and aromatic hydrocarbon groups may contain a substituent such as a halogen atom, e.g. a chlorine or bromine, a hydroxyl group, a carboxyl group, a hydrocarbyloxy group, an acyl group, an acyloxy group, a hydrocarbyloxycarbonyl group or an amino group. Examples of the hydrocarbon group, hydrocarbyloxy group, acyl group, acyloxy group and hydrocarbyloxycarbonyl group include those described above in connection with the general formula (I).

Illustrative of suitable polyhydrogenated nitrogen-containing compounds are $NH_3$, $NH_2NH_2$ and alkylamines such as $CH_3NH_2$, $C_2H_5NH_2$ and $C_6H_5NH_2$. Above all, the use of $NH_3$ or $NH_2NH_2$ is particularly preferred. The more preferred compound is $NH_3$.

The above-mentioned polyhydrogenated nitrogen-containing compound having at least two hydrogen atoms bonded to the nitrogen atom may be used in conjunction with a monohydrogenated nitrogen-containing compound having one hydrogen atom. The amount of the monohydrogenated nitrogen-containing compound having one hydrogen atom bonded to the nitrogen atom is not more than 80 mole %, preferably not more than 50 mole %, based on a total amount of the monohydrogenated nitrogen-containing compound and the polyhdyrogenated nitrogen-containing compound. For reasons of producing a high molecular weight polysilazane, the amount is desirably not more than 20 mole %. The monohydrogenated nitrogen-containing compound serves as an agent for controlling the molecular weight of the polysilazane and is bonded to a terminus of the polysilazane polymer.

In one embodiment of the present invention, the polyaminosilane compound is reacted with the polyhydrogenated nitrogen-containing compound having at least two hydrogen atoms bonded to the nitrogen atom in the presence of a basic catalyst to obtain a polysilazane.

In the above embodiment, when $H_2Si(NMe_2)_2$ and ammonia ($NH_3$) are used as the polyaminosilane compound and the polyhydrogenated nitrogen-containing compound, respectively, the reaction resulting in the production of a polysilazane is as follows:

n[H₃SiN(CH₃)₂]+nNH₃⇌n[H₃SiNH₂]+n[(CH₃)₂NH]  (IV)

n[H₃SiN(CH₃)₂]+n[H₃SiNH₂]→-(H₂SiNHSiH₂)n⁻⁺n[(CH₃)₂NH]

The above reaction may be carried out at a temperature of −70 to 200° C., preferably −20 to 50° C. and under an ambient pressure, pressurized or reduced pressure condition. The polyaminosilane compound is used in an amount of 0.01 to 100 moles, preferably 0.1 to 10 moles, per mole of the polyhydrogenated nitrogen-containing compound. For the purpose of obtaining a linear polysilazane, the amount of the polyaminosilane compound is 0.3 to 3 moles, preferably about 1 mole. The catalyst may be used in an amount of at least 0.01 mole per mole of the polyaminosilane. For the purpose of accelerating the reaction, the amount of the catalyst is at least 0.1 mole. Preferably, the amount of the catalyst is used is at least 1 mole, preferably 1 to 10 moles, per mole of the polyaminosilane. The upper limit of the amount of the catalyst is about 50 moles.

The basic catalyst used in the reaction of the polyaminosilane compound with the polyhydrogenated nitrogen-containing compound may be a substance which is basic and which does not react with the raw materials and, thus, is not specifically limited. The basic catalyst includes organic bases and inorganic bases. The organic bases include amine compounds and ion exchange resins. In the present invention, linear or cyclic tertiary amine compounds are particularly preferably used as the organic bases.

As the inorganic bases, there may be mentioned hydroxides, oxides and salts of an alkali metal; hydroxides, oxides and salts of an alkaline earth metal; and other solid bases. Preferably, sodium hydroxide is used. The form of the catalyst is not specifically limited and may be a gas, liquid or solid.

As the gaseous or liquid basic catalysts, there may be mentioned linear tertiary amines, such as trimethylamine, triethylamine and tripropylamine, and cyclic tertiary amines such as pyridine, pyridazine, pyrimidine, pyrazine, quinoline, acridine, pyridyl and lutidine. The gaseous amine compounds are used after dissolution in a solvent.

The solid basic catalysts include ion exchange resins having basicity or a basic point and basic solid oxides.

As the basic ion exchange resins, there may be mentioned ion exchange resins having substituted or non-substituted amino groups. The basic solid oxides include metal oxides of single metal and complex metal oxides. From the standpoint of reactivity, the use of a metal oxide having a high basicity is preferred. Basic single-metal oxides include alkali metal oxides, alkaline metal oxides and transition metal oxides.

Illustrative of alkali metal oxides are $Li_2O$, $Na_2O$, $K_2O$, $Rb_2O$ and $Cs_2O$. Illustrative of alkaline metal oxides are BeO, MgO, CaO, SrO, BaO and RaO. Of the alkaline earth metal oxides, magnesia (MgO) and calcia (CaO) are preferable for reasons of basicity, costs and easiness in handling.

Illustrative of transition metal oxides are $Sc_2O_g$, $TiO_2$, $Cr_2O_3$, MnO, $Fe_2O_3$, CoO, NiO, $Cu_2O$, ZnO, $Y_2O_3$, $ZrO_2$, $Rh_2O_3$, PdO, $Ag_2O$, CdO, $HfO_2$, $IrO_2$, PtO, $Au_2O$, HgO, oxides of lanthanides and oxides of actinoids. Of the transition metal oxides, nickel oxide, cobalt oxide and zinc oxide are preferable for reasons of basicity, costs and easiness in handling.

The complex metal oxides having basicity contain a basic metal oxide as a component thereof. In such metal oxides, the basic metal oxide serves as catalytically active cites. Illustrative of complex metal oxides containing $SiO_2$ are $Li_2O$—$SiO_2$, $Na_2O$—$SiO_2$, $K_2O$—$SiO_2$, $Rb_2O$—$SiO_2$, $Sc_2O$—$SiO_2$BeO—$SiO_2$, MgO—$SiO_2$, CaO—$SiO_2$, SrO—$SiO_2$, BaO—$SiO_2$, RaO—$SiO_2$, $SC_2O_3$—$SiO_2$, $TiO_2$—$SiO_2$, $Sr_2O_3$—$SiO_2$, MnO—$SiO_2$, $Fe_2O_3$—$SiO_2$, CoO—$SiO_2$, NiO—$SiO_2$, $Cu_2O$—$SiO_2$, ZnO—$SiO_2$, $Y_2O_3$—$SiO_2$, $ZrO_2$—$SiO_2$, $Rh_2O_9$—$SiO_2$, PdO—$SiO_2$, $Ag_2O$—$SiO_2$, CdO—$SiO_2$, $HfO_2$—$SiO_2$, $IrO_2$—$SiO_2$PtO—$SiO_2$, $Au_2O$—$SiO_2$, HgO—$SiO_2$, lanthanide oxide—$SiO_2$, and actinide oxide—$SiO_2$.

Examples of the other complex metal oxides include those of the above-mentioned silica-containing complex metal oxides in which alumina, titania or zirconia is substituted for the silica.

A method of preparing the above basic oxide catalyst is not specifically limited. However, a method including a heat treating step is preferable for obtaining a highly active catalyst. Such a method may be, for example, a method in which a nitrate, carbonate, oxalate, hydroxide, etc. of the corresponding metal is heat treated at an ambient pressure or a reduced pressure in air or an inert gas atmosphere (e.g. nitrogen, argon, etc.) at a temperature of about 200 to 1,4000° C., though the temperature depends upon the kind of the substance. The heat treatment time is generally 10 minutes to 100 hours, preferably 10 minutes to 20 hours.

The reaction of the present invention can be carried out using a solvent. A compound such as an alcohol or water which reacts with a polysilazane should not be used as the solvent. An organic solvent such as a hydrocarbon, a halogenated hydrocarbon, an ester, a ketone or an ether may be used as the solvent. When the polyaminosilane compound used as the raw material is a liquid, it is not always necessary to use a solvent. But a solvent is used when the polyaminosilane compound is solid.

Illustrative of suitable solvents are xylene, toluene, benzene, pentane, pentene, hexane, hexene, heptane, heptene, octane, octene, nonane, nonene, decane, decene. dichloromethane, tetrahydrofuran (THF), diethyl ether, cyclohexane, cyclohexane, methylcyclohexane, ethylcyclohexane, limonene, p-menthane and dekalin.

In the second embodiment of the present invention, a polyhydrogenated silicon compound having at least two hydrogen atoms bonded to the Si is reacted with a polyhydrogenated nitrogen-containing compound having at least two hydrogen atoms bonded to the nitrogen atom in the presence of a basic solid oxide catalyst to obtain a polysilazane.

In the above embodiment, when phenylsilane (PhSiH$_3$) and ammonia (NH$_3$) are used as the polyhydrogenated silicon compound and the polyhydrogenated nitrogen-containing compound, respectively, the reaction resulting in the production of a polysilazane is as follows:

$$nPhSiH_3 + nNH_3 \rightarrow -(PhsiHNH)n-^+ 2nH_2 \quad (VII)$$

The above reaction may be carried out at a temperature of 0 to 300° C., preferably 80 to 200° C. and under an ambient pressure, pressurized or reduced pressure condition. The polyhydrogenated silicon compound is used in an amount of 0.01 to 100 moles, preferably 0.1 to 10 moles, per mole of the polyhydrogenated nitrogen-containing compound. For the purpose of obtaining a linear polysilazane, the amount of the polyhydrogenated silicon compound is 0.3 to 3 moles, preferably about 1 mole. The catalyst may be used in an amount of at least 0.005 mole per mole of the aminosilane. For the purpose of accelerating the reaction, the amount of the catalyst is at lest 0.05 mole, more preferably at least 0.5 mole. The upper limit of the amount of the catalyst is about 10 moles. The reaction time is 0.1 to 100 hours, preferably 1–10 hours. The reaction atmosphere is preferably an inert gas atmosphere, especially dry inert gas atmosphere, such as nitrogen gas or argon gas.

The catalyst used in the reaction of the polyhydrogenated silicon compound with the polyhydrogenated nitrogen-containing compound is a solid, basic oxide. Examples of the solid, basic oxide catalyst include various oxides described previously.

A solvent may be used for carrying out the above reaction. A compound, such as an alcohol or water, which reacts with a polysilazane cannot be used as the solvent. An organic solvent such as a hydrocarbon, an ester, a ketone or an ether may be used. When the polyhydrogenated silicon compound used as a raw material is liquid, the use of the solvent is not always necessary. When the polyhydrogenated silicon compound is solid, a solvent is used. Examples of the solvent include those described previously.

As a result of the reaction of the polyhydrogenated silicon compound with the polyhydrogenated nitrogen-containing compound, a dehydrogenative condensation reaction occurs, thereby producing a polysilazane.

EXAMPLE

The present invention will be further described in detail below by way of examples.

Reference Example 1

In an autoclave were charged 30.1 g of dichlorosilane SiH$_2$Cl$_2$ and 100 g of hexane. While maintaining the contents at 0° C. with stirring, 53.8 g of (CH$_3$)$_2$NH were introduced thereinto. The reaction was continued with stirring for 2 hours. Thereafter, white precipitates of (CH$_3$)$_2$NH·HCl as a by-product were separated by filtration to obtain a colorless transparent solution. This solution was distilled at ambient pressure to recover a fraction of 92–95° C. The thus obtained transparent liquid was analyzed by GC-MB and found to be SiH$_2$[N(CH$_3$)$_2$]$_2$.

Example 1

In 28 g of xylene were dissolved 2.1 g of SiH$_2$[N(CH$_3$)$_2$]$_2$ obtained in Reference Example 1. This was then charged in an autoclave together with 15 g of (C$_2$H$_5$)$_3$N as a basic catalyst. The contents were then maintained at 0° C. Then, 443 ml of NH$_3$ were introduced into the autoclave using a mass flow and the contents were stirred for 3 hours. After the reaction, the reaction system was made in a reduced pressure for the removal of the dissolved NH$_3$ and (CH$_3$)$_2$NH from the reaction liquid and for the termination of the reaction. Further, the basic catalyst (C$_2$H$_5$)$_3$N was removed in vacuo to obtain a xylene solution of the product. The IR analysis revealed that the product was a polysilazane. The measurement of the molecular weight of the product revealed that the number average molecular weight was 400 and the weight average molecular weight was 1,200. The $^1$H-NMR measurement revealed that the remaining –N(CH$_3$)$_2$ groups were 1.3% based on the amount of the silicon groups.

Example 2

In 28 g of xylene were dissolved 2.1 g of SiH$_2$[N(CH$_3$)$_2$]$_2$ obtained in Reference Example 1. This was then charged in an autoclave together with 15 g of pyridine as a catalyst. The contents were then maintained at 0° C. Then, 0.537 g of CH$_3$NH$_2$ was introduced into the autoclave and the contents were stirred for 3 hours. After the reaction, the reaction system was made in a reduced pressure for the removal of the dissolved CH$_3$NH$_2$ and (CH$_3$)$_2$NH from the reaction liquid and for the termination of the reaction Further, the basic catalyst of pyridine was removed in vacuo to obtain a xylene solution of the product. The IR and $^1$H-NMR analysis revealed that the product was a polysilazane. The measurement of the molecular weight of the product revealed that the number average molecular weight was 500 and the weight average molecular weight was 1,300.

Example 3

In 100 g of xylene were dissolved 1.08 g (9.2 mmol) of SiH$_2$[N(CH$_3$)$_2$]$_2$ obtained in Reference Example 1. This was then charged in an autoclave together with 0.1 g (2.5 mmol) of MgO as a basic catalyst. The contents were then maintained at 0° C. Then, 206 ml of NH$_3$ were introduced into the autoclave using a mass flow and the contents were stirred for 3 hours After the reaction, the reaction system was made in a reduced pressure for the removal of the dissolved $NH_3$ and $(CH_3)_2NH$ from the reaction liquid and for the termination of the reaction. Further, the basic catalyst Mgo was removed by filtration to obtain a xylene solution of the product. The IR analysis revealed that the product was a polysilazane. The measurement of the molecular weight of the product revealed that the number average molecular weight was 320 and the weight average molecular weight was 410. The $^1$H-NMR measurement revealed that the remaining —$N(CH_3)_2$ groups were 0.22% based on the amount of the silicon groups.

Comparative Example 1

In 43 g of xylene were dissolved 2.1 g of $SiH_2[N(CH_3)_2]_2$ obtained in Reference Example 1 and the solution was maintained at 0° C. Then, 443 ml of $NH_3$ were introduced using a mass flow and the mixture was stirred for 3 hours. After the reaction, the reaction system was made in a reduced pressure for the removal of the dissolved $NH_3$ and $(CH_3)_2NH$ from the reaction, liquid And for the termination of the reaction, thereby to obtain a xylene solution of the product revealed that the number average molecular weight was 300 and the weight average molecular weight wan 500. The $^1$H-NMR measurement revealed that the remaining —$N(CH_3)_2$ groups were 13.1% based on the amount of the silicon groups. As compared with the results of Example 1, the amount of the remaining —$N(CH_3)_2$ groups was much larger. Thus, it was confirmed that, in the absence of a basic catalyst, the amine interchange failed to smoothly occur.

Example 4

In 28 g of xylene were dissolved 2.0 g of $SiH_2[N(CH_3)_2]_2$ obtained in Reference Example 1. This was then charged in an autoclave together with 10 g of sufficiently vacuum-dried, $NMe_2$ group-containing ion exchange resin (WA30 of Mitsubishi Chemical Inc.) as a basic catalyst. The contents were then maintained at 0° C. Then, 0.41 g of $NH_3$ was introduced into the autoclave and the contents were stirred for 3 hours. After the reaction, white gel-like product was obtained. The reaction system was made in a reduced pressure for the removal of the dissolved $NH_3$ and $(CH_3)_2NH$ and for the termination of the reaction. Further, the ion exchange resin was removed by filtration to obtain a product. The thus obtained white precipitates were filtered and subjected to IR analysis to reveal that the product was a polysilazane.

As understood from the foregoing, according to the process of the present invention in which a polyaminosilane compound and a polyhydrogenated nitrogen-containing compound are subjected to an amine interchange reaction in the presence of a basic catalyst, a polysilazane is produced with a high yield without producing by-products of $H_2O$ and salts resulting from an acid-base reaction, because an acid catalyst is not used.

Example 5

3 g of $Mg(CH)_2$ pulverized in a mortar into a particle diameter of 30–60 mesh were filled in a glass tube having an outside diameter of 12 mm, an inside diameter of 10 mm and a length of 30 cm and subjected to heat decomposition at 500° C. under a reduced pressure of 0.3 mmHg for 2 hours in a furnace, thereby obtaining 1 g of Mgo.

In an autoclave reactor placed in a nitrogen box, 80 ml of xylene as a solvent, 1 g (25 mmol) of MgO as a catalyst and 5.4 g (50 mmol) of phenylsilane ($PhSiH_3$) as a raw material were charged.

Into this autoclave were introduced 1,118 Ncc (50 mmol) of $NH_3$ as a gas phase while stirring the reaction liquid. Using an oil bath, the reaction mixture was then stirred at 150° C. for 16 hours. After completion of the reaction, the reaction liquid was cooled. The MgO catalyst was filtered with a filter to obtain a solution of the product, The product was measured for the molecular weight thereof by gel chromatography (GFC) to reveal that the number average molecular weight Mn was 400 and the weight average molecular weight MW was 3,300. The product was identified as being a polysilazane by confirming the presence of a peak (800–900 cm$^{-1}$) attributed to silazane by the infra red spectroscopy.

Example 6

10 g of nickel carbonate were filled in an alumina boat and subjected to heat decomposition at 500° C. in a dry air atmosphere for 2 hours in a tubular furnace, thereby obtaining NiO. In an autoclave reactor placed in a nitrogen box, 80 ml of xylene as a solvent, 1.88 g of NiO as a catalyst and 5.4 g of $PhsiH_3$ as a raw material were charged. Thereafter, 1,118 Nml of $NH_3$ were introduced as a gas phase while stirring the reaction mixture. Using an oil bath, the reaction mixture was then stirred at 150° C. for 4 hours.

After completion of the reaction, the reaction liquid was cooled. The NiO catalyst was filtered with a filter to obtain a solution of the product. The product was measured for the molecular weight thereof by GPC to reveal that the number average molecular weight Mn was 310 and the weight average molecular weight Mw was 810. The product was identified as being a polysilazane by confirming the presence of a peak (800–900 cm$^{-1}$) attributed to silazane by the infra red spectroscopy.

Example 7

4.2 g of $CaC_2O_4 \cdot H_2O$ pulverized in a mortar were filled in an alumina boat and subjected to heat decomposition at 1,200° C. in a nitrogen atmosphere for 8 hours in a furnace, thereby obtaining 1.5 g of CaO. In an autoclave reactor placed in a nitrogen box, 40 ml of xylene as a solvent, 1.5 g of CaO as a catalyst and 21.6 g of $PhSiH_3$ as a raw material were charged. Into this autoclave were introduced 1,118 Ncc (50 mmol) of $NH_3$ as a gas phase while stirring the reaction mixture. Using an oil bath, the reaction mixture was then stirred at 150° C. for 4 hours.

After the lapse of 4 hours, the reaction liquid was cooled to room temperature. The CaO catalyst was filtered with a filter to obtain a product. The product was measured for the molecular weight thereof by GPC to reveal that the number average molecular weight Mn was 300 and the weight average molecular weight Mw was 2,400. The product was identified as being a polysilazane by confirming the presence of a peak (800–900 cm$^{-1}$) attributed to silazane by the IR spectroscopy.

With the reaction according to the present invention between a polyhydrogenated silicon compound and a polyhydrogenated nitrogen-containing compound in the presence of a basic catalyst, a polysilazane can be produced in a safe manner with low costs without using an expensive transition metal complex catalyst or a dangerous alkali metal hydride and without producing a large amount of halide by-products.

We claim:

1. A process for the production of a polysilazane having Si—N linkages in the main chain thereof, characterized in that a polyaminosilane compound having at least two amino groups bonded to a silicon atom thereof is subjected to an amine inter-exchange reaction with a polyhydrogenated nitrogen-containing compound having at least two hydrogen atoms bonded to the nitrogen atom in the presence of a basic catalyst.

2. A process according to claim 1, wherein said polyaminosilane compound is a compound represented by the following general formula:

$$Si(R^1)(R^2)(R^3)(R^4)$$

wherein $R^1$, $R^2$, $R^3$ and $R^4$ each stand for an amino group, a hydrogen atom, a hydrocarbon group, a hydrocarbyloxy group, an acyl group, an acyloxy group or a hydrocarbyloxycarbonyl group with the proviso that at least two of $R^1$–$R^4$ are amino groups.

3. A process according to claim 1, wherein said polyaminosilane compound is used in the form of a mixture with a monoaminosilane compound.

4. A process according to claim 1, wherein said polyhydrogenated nitrogen-containing compound is a compound represented by the following general formula:

$$R^{21}NH_2$$

wherein $R^{21}$ stands for a hydrogen atom, a hydrocarbon group, a hydrocarbyloxy group, an acyl group, an acyloxy group, a hydrocarbyloxycarbonyl group, a carboxyl group or a hydroxyl group.

5. A process according to claim 1, wherein said polyhydrogenated nitrogen-containing compound is used in the form of a mixture with a monohydrogenated nitrogen-containing compound.

6. A process according claim 1, wherein said basic catalyst is a liquid tertiary amine compound.

7. A process according to claim 1, wherein said basic catalyst is a basic, ion exchange resin.

8. A process according to claim 1, wherein said basic catalyst is a basic solid oxide.

9. A process according to claim 8, wherein said basic solid oxide is at least one basic metal oxide selected from the group consisting of magnesium oxide, calcium oxide, nickel oxide and zinc oxide.

10. A process according to claim 8, wherein said basic solid oxide is a complex metal oxide containing basic metal oxide.

11. A process for the production of a polysilazane having Si—N linkages in the main chain thereof, characterized in that a polyhydrogenated silicon compound having at least two hydrogen atoms bonded to the silicon atom is reacted with a polyhydrogenated nitrogen-containing compound having at least two hydrogen atoms bonded to the nitrogen atom in the presence of a basic solid oxide catalyst.

12. A process according to claim 11, wherein said polyhydrogenated silicon compound is a compound represented by the following general formula:

$$Si(R^{11})(R^{12})(R^{13})(R^{14})$$

wherein $R^{11}$–$R^{14}$ each stand for a hydrogen atom, a hydrocarbon group, a hydrocarbyloxy group, an acyl group, an acyloxy group, a hydrocarbyloxycarbonyl group or an amino group with the proviso that at least two of $R^{11}$–$R^{14}$ are hydrogen atoms.

13. A process according to claim 11, wherein said polyhydrogenated silicon compound is a compound represented by the following general formula:

$$(R^{17})(R^{16})(R^{15})Si—Si(R^{11})(R^{12})(R^{13})$$

wherein $R^{11}$–$R^{13}$ and $R^{15}$–$R^{17}$ each stand for a hydrogen atom, a hydrocarbon group, a hydrocarbyloxy group, an acyl group, an acyloxy group, a hydrocarbyloxycarbonyl group, a carboxyl group or a hydroxyl group with the proviso that at least two of $R^{11}$–$R^{13}$ and $R^{15}$–$R^{17}$ are hydrogen atoms.

14. A process according to claim 11, wherein said polyhydrogenated silicon compound is used in the form of a mixture with a monohydrogenated silicon compound.

15. A process according to claim 11, wherein said polyhydrogenated nitrogen-containing compound is a compound represented by the following general formula:

$$R^{21}NH_2$$

wherein $R^{21}$ stands for a hydrogen atom, a hydrocarbon group, a hydrocarbyloxy group, an acyl group, an acyloxy group, a hydrocarbyloxycarbonyl group, a carboxyl group or a hydroxyl group.

16. A process according to claim 11, wherein said polyhydrogenated nitrogen-containing compound is used in the form of a mixture with a monohydrogenated nitrogen-containing compound.

17. A process according to claim 11, wherein said basic solid oxide is at least one basic metal oxide selected from the group consisting of magnesium oxide, calcium oxide, nickel oxide and zinc oxide.

18. A process according to claim 11 wherein said basic solid oxide is a complex metal oxide containing basic metal oxide.

* * * * *

UNITED STATES PATENT AND TRADEMARK OFFICE
CERTIFICATE OF CORRECTION

PATENT NO. : 5,905,130
DATED : May 18, 1999
INVENTOR(S) : NAKAHARA et al

Page 1 of 2

It is certified that error appears in the above-identified patent and that said Letters Patent is hereby corrected as shown below:

Col. 1, line 33, "Faint" should read --Paint--.

Col. 2, line 44, "Si(R$_1$)(R$^2$)(R$^3$)(R$^4$)" should read --Si(R$^1$)(R$^2$)(R$^3$)(R$^4$)--.

Col. 3, line 31, "aromatie" should read --aromatic--.

Col. 4, line 43, "n-C$_3$H$_5$" should read --n-C$_3$H$_7$--;
    line 44, "CH$_3$-SiH$_3$" should read --CH$_3$O-SiH$_3$--;
    line 45, "(C$_2$HS)" should read --(C$_2$H$_5$)--;
    line 46, "H$_3$Si-SiH$_3$(CH$_3$) H$_2$Si-SiH$_3$" should read --H$_3$Si-SiH$_3$, (CH$_3$)H$_2$Si-SiH$_3$--; and
    line 61, "R$_{18}$" should read --R$^{14}$--.

Col. 5, line 56, "n$^-$+n" should read --n$^-$+n--.

Col. 6, line 42, "O$_g$" should read --O$_9$--;
    line 54, "SiO$_2$BeO-SiO$_2$," should read --SiO$_2$, BeO-SiO$_2$,--;
    line 58, "Rh$_2$O$_9$-SiO$_2$" should read --Rh$_2$O$_8$-SiO$_2$--; and

UNITED STATES PATENT AND TRADEMARK OFFICE
CERTIFICATE OF CORRECTION

PATENT NO. : 5,905,130
DATED : May 18, 1999           Page 2 of 2
INVENTOR(S) : NAKAHARA et al It is certified that error appears in the above-identified patent and that said Letters Patent is hereby corrected as shown below:

line 59, "SiO$_2$PtO-SiO$_2$," should read --SiO$_2$, PtO-SiO$_2$,--.

Col. 7, line 7, "1,4000°C" should read --1,400°C--;
line 38, "nPhSiH$_3$+nNH$_3$→-(PhsiHNH)n⁻+2nH$_2$" should read --nPhSiH$_3$+nNH$_3$→-(PhSiHNH)n⁻+2nH$_2$--.

Col. 8, line 23, "GC-MB" should read --GC-MS--.

Col. 9, line 24, after "product" insert --. The measurement of the molecular weight of the product--.

Col. 10, line 8, "(GFC)" should read --(GPC)--;
line 10, "MW" should read --Mw--; and
line 21, "PhsiH$_3$" should read --PhSiH$_3$--.

Signed and Sealed this

Fifth Day of September, 2000

*Attest:*

Q. TODD DICKINSON

*Attesting Officer*     *Director of Patents and Trademarks*